US008040815B2

(12) United States Patent
Silk et al.

(10) Patent No.: US 8,040,815 B2
(45) Date of Patent: Oct. 18, 2011

(54) SPECTRUM COORDINATION CONTROLLER

(75) Inventors: S. David Silk, Barrington, IL (US);
George R. Economy, Arlington Heights, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 961 days.

(21) Appl. No.: 11/946,247

(22) Filed: Nov. 28, 2007

(65) Prior Publication Data
US 2009/0135767 A1 May 28, 2009

(51) Int. Cl.
*H04W 4/00* (2009.01)
(52) U.S. Cl. ........ 370/252; 370/254; 370/329; 455/450; 455/509
(58) Field of Classification Search ........................ None
See application file for complete search history.

(56) References Cited

U.S. PATENT DOCUMENTS

| | | | |
|---|---|---|---|
| 4,930,120 A * | 5/1990 | Baxter et al. | 370/487 |
| 5,040,238 A | 8/1991 | Comroe et al. | |
| 5,212,831 A | 5/1993 | Chuang et al. | |
| 5,581,597 A * | 12/1996 | Dent et al. | 455/450 |
| 5,778,322 A * | 7/1998 | Rydbeck | 455/558 |
| 6,047,190 A | 4/2000 | Haleem et al. | |
| 6,055,432 A | 4/2000 | Haleem et al. | |
| 6,101,176 A | 8/2000 | Honkasalo et al. | |
| 7,027,827 B2 | 4/2006 | Bonta et al. | |
| 7,035,275 B2 | 4/2006 | Liang | |
| 7,058,796 B2 | 6/2006 | Lynn et al. | |
| 7,095,754 B2 | 8/2006 | Benveniste | |
| 7,096,160 B2 | 8/2006 | Skidmore et al. | |
| 7,110,756 B2 | 9/2006 | Diener | |
| 7,154,874 B2 | 12/2006 | Bhagwat et al. | |
| 7,162,507 B2 | 1/2007 | Carter | |
| 7,171,324 B1 | 1/2007 | Pleasant et al. | |
| 7,180,877 B1 | 2/2007 | Benveniste | |
| 7,181,225 B1 | 2/2007 | Moton, Jr. et al. | |
| 7,184,770 B1 | 2/2007 | Narasimhan et al. | |
| 7,184,777 B2 | 2/2007 | Diener et al. | |
| 2003/0190918 A1 * | 10/2003 | Frieder et al. | 455/450 |

(Continued)

FOREIGN PATENT DOCUMENTS
EP 1 742 497 A 1/2007

OTHER PUBLICATIONS

Jost Weinmiller, "PCT Search Report and Written Opinion," WIPO, ISA/EP, European Patent Office, HV Rijswijk, Netherlands, Feb. 26, 2009.

(Continued)

*Primary Examiner* — Chi H. Pham
*Assistant Examiner* — Shick Hom
(74) *Attorney, Agent, or Firm* — Jeffrey K. Jacobs; John T. Bretscher; Valerie M. Davis (57) ABSTRACT

A method, wireless controller, and information processing system that define communication channel allocation. Communication channel allocation commands associated with a first network are monitored (102). The first network (102) comprises a plurality of communication frequencies assigned by the communication channel allocation commands. A set of communication frequencies are determined that have been assigned to wireless devices (108) associated with the first network (102) in response to the monitoring. A specification of unused communication frequencies within the plurality of communication frequencies are transmitted to a second network (104) in response to the determining.

20 Claims, 9 Drawing Sheets

U.S. PATENT DOCUMENTS

2007/0195731 A1     8/2007     Camp ........................... 370/329
2007/0211680 A1     9/2007     Laroia et al. .................. 370/338

OTHER PUBLICATIONS

Kermoal et al., "Spectrum Sharing for WINNER Radio Access Networks," IEEE 1st International Conference on Cognitive Radio-Oriented Wireless Networks and Communications 2006, Jun. 1, 2006, pp. 1-5.

Zhao et al., "A Survey of Dynamic Spectrum Access," IEEE Signal Processing Magazine, IEEE Service Center, Piscataway, NJ, USA, vol. 24, No. 3, May 1, 2007, pp. 79-89.

Seidel, Scott: "IEEE 802 Tutorial: Cognitive Radio," presentation at the 2005 IEEE Plenary 802 Meeting in San Francisco, CA, Jul. 18, 2005, 21 pages.

Rieser, C.J. et al.: "Cognitive Radio Testbed: Further Details and Testing of a Distributed Genetic Algorithm Based Cognitive Engine for Programmable Radios," Proc. MILCOM, Monterey, CA, 2004, 7 pages.

Bostian, Charles W. et al.: "Rapidly Deployable Broadband Communications for Disaster Response," 6th Annual International Symposium on Advanced Radio Technologies, Mar. 4, 2003, 28 pages.

Polson, John: "Cognitive Radio Applications in Software Defined Radios," presentation at the 2005 IEEE Plenary 802 Meeting in San Francisco, CA, Jul. 18, 2005, 24 pages.

Seidel, Scott et al.: "IEEE 802 Tutorial: Cognitive Radios—How Close to Reality?" presentation at the 2005 IEEE Plenary 802 Meeting in San Francisco, CA, Jul. 18, 2005, 45 pages.

* cited by examiner

SITE D (208)

| CHANNEL | TRANSMIT | RECEIVE |
|---|---|---|
| 1 | T1 | R1 |
| 2 | T12 | R12 |
| 3 | T3 | R3 |
| 4 | T18 | R18 |
| 5 | T5 | R5 |
| 6 | T6 | R6 |
| 7 | T7 | R7 |
| 8 | T5 | R5 |
| 9 | T15 | R15 |
| 10 | T10 | R10 |

SITE E (210)

| CHANNEL | TRANSMIT | RECEIVE |
|---|---|---|
| 1 | T21 | R21 |
| 2 | T9 | R9 |
| 3 | T19 | R19 |

SITE A (202)

| CHANNEL | TRANSMIT | RECEIVE |
|---|---|---|
| 1 | T11 | R11 |
| 2 | T2 | R2 |
| 3 | T14 | R14 |

SITE B (204)

| CHANNEL | TRANSMIT | RECEIVE |
|---|---|---|
| 1 | T13 | R13 |
| 2 | T22 | R22 |
| 3 | T16 | R16 |

SITE C (206)

| CHANNEL | TRANSMIT | RECEIVE |
|---|---|---|
| 1 | T17 | R17 |
| 2 | T4 | R4 |
| 3 | T20 | R20 |

SITE A (302)

| | N | DELTA |
|---|---|---|
| A | T11 | 0.16 |
| A | T2 | 1.80 |
| A | T14 | 0.16 |
| A | R11 | 7.04 |
| A | R2 | 1.80 |
| A | R14 | 0.16 | n+x  (303)

SITE C

| | n | DELTA |
|---|---|---|
| C | T17 | 0.66 |
| C | T4 | 3.00 |
| C | T20 | 1.00 |
| C | R17 | 5.00 |
| C | R4 | 3.00 |
| C | R20 | 1.00 | n+x  (306)

SITE D (406)

| | | DELTA |
|---|---|---|
| D | T17 | 0.10 |
| D | T4 | 0.39 |
| D | T20 | 0.26 |
| D | R17 | 0.31 |
| D | R4 | 0.43 |
| D | R20 | 0.26 |
| D | R20 | 0.13 |
| D | R20 | 0.16 |
| D | R20 | 0.31 |
| D | R20 | 1.34 |
| D | R20 | 5.41 |
| D | R20 | 0.39 |
| D | R20 | 0.26 |
| D | R20 | 0.31 |
| D | R20 | 0.43 |
| D | R20 | 0.26 |
| D | R20 | 0.13 |
| D | R20 | 0.16 |
| D | R20 | 0.31 |
| D | R20 | 1.34 | n+x  (308)

SITE B

| | N | DELTA |
|---|---|---|
| B | T13 | 2.09 |
| B | T22 | 1.28 |
| B | T16 | 1.54 |
| B | R13 | 5.19 |
| B | R22 | 1.28 |
| B | R16 | 1.54 | n+x  (304)

SITE B

| | N | DELTA |
|---|---|---|
| E | T17 | 1.81 |
| E | T4 | 2.74 |
| E | T20 | 0.21 |
| E | R17 | 6.05 |
| E | R4 | 4.74 |
| E | R20 | 0.21 | n+x  (310)

SPECTRUM COORDINATION CONTROLLER

FIELD OF THE INVENTION

The present invention generally relates to the field of wireless communications, and more particularly relates to managing allocation of communication frequencies available in a host/primary network to one or more secondary networks.

BACKGROUND OF THE INVENTION

Wireless communication technology has evolved greatly over the recent years. Wireless communication networks can include a variety of different network technologies. Furthermore, one wireless communication network may comprise underused spectrum that another wireless communication network can utilize on a secondary basis. Traditionally, wireless communication technology allows for systems to co-exist independently while sharing a common resource, such as spectrum. However, traditional wireless communication systems do not coordinate the use of the spectrum. Interoperability of systems using the same spectrum can be resolved, for example, through cooperative operation among network devices, e.g., synchronization and spatial scheduling can be employed to mitigate interference associated with network operation.

In situations in which two dissimilar network solutions/technologies are co-located such as a network installed some time ago at a fixed geographic location that can serve as a host for a newly installed second network, the systems do not coordinate the use of critical system resources such as spectrum. Furthermore, the first system may be the primary licensed system that was allocated the spectrum and the second system may be licensed to use the spectrum on a secondary basis; namely, allowed to use the spectrum provided that harmful interference does not degrade the performance of the primary licensed system. However, current technology generally does not provide an efficient and advantageous way for maintaining proper synchronization and critical time-aligned operations between the secondary the host/primary networks for mitigating harmful interference to the host/primary network. For example, current technologies generally do not provide a system in which the operation of a secondary network, i.e., a network that co-exists with an existing system, includes yielding spectrum right-of-way when spectrum scavenged by the secondary network is "recalled" by the host/primary network.

Therefore a need exists to overcome the problems with the prior art as discussed above.

SUMMARY OF THE INVENTION

A method that defines communication channel allocation is disclosed. The method includes monitoring communication channel allocation commands associated with a first network. The first network comprises a plurality of communication frequencies assigned by the communication channel allocation commands. A set of communication frequencies are determined that have been assigned to wireless devices associated with the first network in response to the monitoring. A specification of unused communication frequencies within the plurality of communication frequencies are transmitted to a second network in response to the determining.

In another embodiment, a wireless communication controller is disclosed. The wireless communication controller includes a channel assignment monitor adapted to monitor communication channel allocation commands associated with a first network. The first network comprises a plurality of communication frequencies assigned by communication channel allocation commands. A channel assignment tracker is communicatively coupled to the channel assignment monitor. The channel assignment tracker is adapted to determine, in response to monitoring by the channel assignment monitor, a set of communication frequencies that have been assigned to wireless devices associated with the first network. A channel availability transmitter is communicatively coupled to the channel assignment tracker. The channel availability transmitter is adapted to transmit, in response to determinations by the channel assignment tracker, to a second network, a specification of unused communication frequencies within the plurality of communication frequencies.

In yet another embodiment, an information processing system is disclosed. The information processing system includes a memory and a processor that is communicatively coupled to the memory. The information processing system also includes a wireless communication controller that is communicatively coupled to the memory and the processor. The wireless communication controller includes a channel assignment monitor adapted to monitor communication channel allocation commands associated with a first network. The first network comprises a plurality of communication frequencies assigned by the communication channel allocation commands. A channel assignment tracker is communicatively coupled to the channel assignment monitor. The channel assignment tracker is adapted to determine, in response to monitoring by the channel assignment monitor, a set of communication frequencies that have been assigned to wireless devices associated with the first network. A channel availability transmitter is communicatively coupled to the channel assignment tracker. The channel availability transmitter is adapted to transmit, in response to determinations by the channel assignment tracker, to a second network, a specification of unused communication frequencies within the plurality of communication frequencies.

An advantage of the various embodiments of the present invention is that the allocation of available spectrum in one wireless communication network to one or more additional wireless communication networks is coordinated. This coordination prevents the degradation of service quality of the host incumbent primary network. The various embodiments of the present invention also maintain proper synchronization and critical time-aligned operations between the host/primary and the secondary networks to mitigate harmful interference to the host/primary network. The various embodiments of the present invention also increase the overall spectral efficiency of the shared spectrum.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The term "wireless device" is intended to broadly cover many different types of devices that can wirelessly receive signals, and optionally can wirelessly transmit signals, and may also operate in a wireless communication system. For example, and not for any limitation, a wireless communication device can include (but is not limited to) any one or a combination of the following: a two-way radio, a cellular telephone, a mobile phone, a smartphone, a two-way pager, a wireless messaging device, a laptop/computer, automotive gateway, or a residential gateway.

Wireless Communication System

Figure 1:
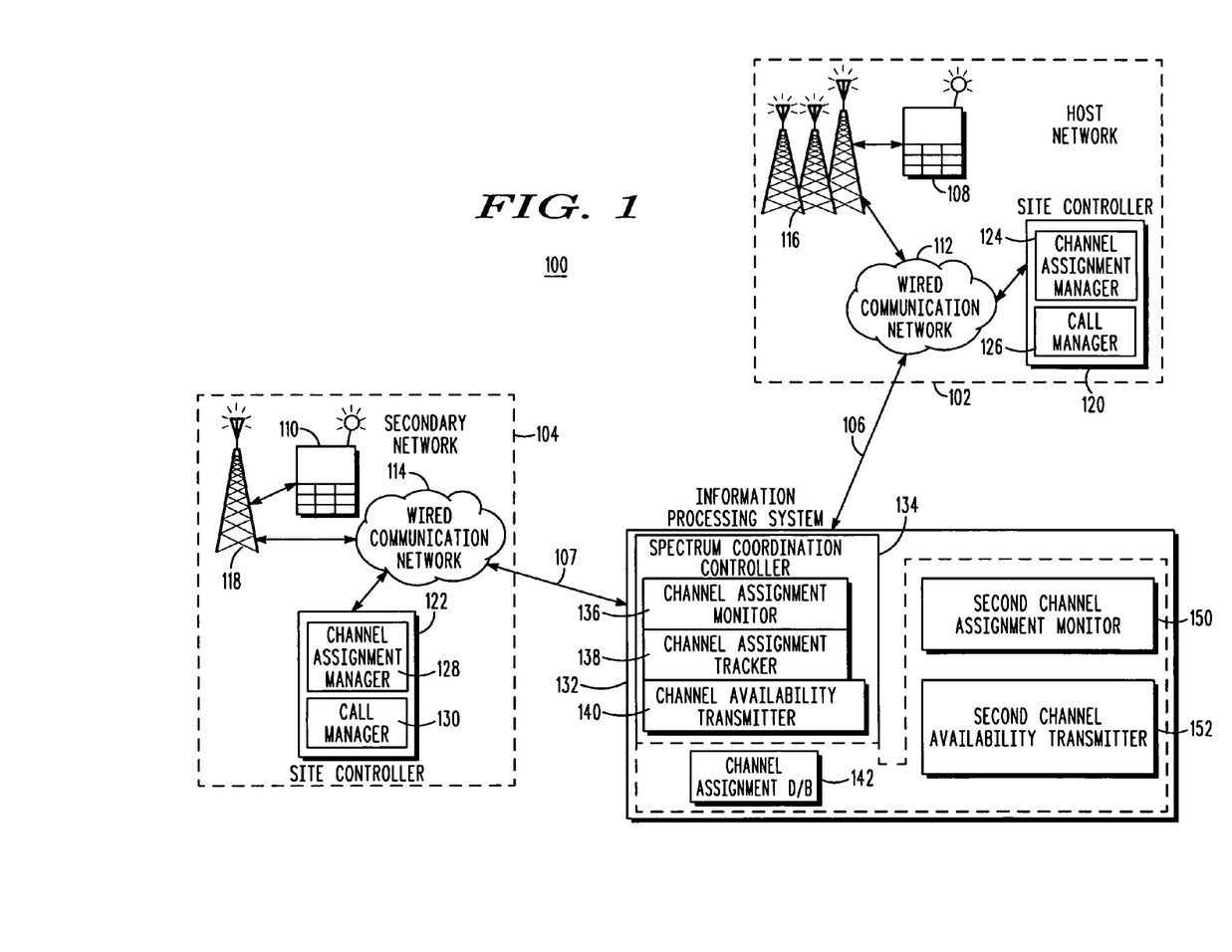
FIG. 1 is block diagram illustrating a wireless communication system, according to one embodiment of the present invention.

According to one embodiment of the present invention as shown in FIG. 1 a wireless communication system 100 is illustrated. FIG. 1 shows a plurality of networks 102, 104. Although only two networks 102, 104 are shown, the wireless communication system 100 can comprise additional networks. In one embodiment, one of the networks 102 is a host/primary network and one or more of the additional networks are secondary networks 104. In one embodiment, a host/primary network can be an underlay network and a secondary network can be an overlay network. The host/primary network 102 is assigned RF spectrum that is divided into channels that can potentially be used by the secondary network(s) 104. Throughout this discussion the terms "host" and "primary" that refer to, for example, host/primary network 102, are used interchangeably.

Each of the wireless communication networks 102, 104 can include one or more communication networks 112, 114 such as a circuit service network and/or a packet data network. The communication networks 112, 114 can either be wired or wireless. Throughout the following discussion the communication networks 112, 114 are referred to as wired communication networks 112, 114 as a non-limiting example.

The wireless communications standard of the networks 102, 104 coupling bases stations 116, 118 to mobiles 108/110 can comprise Code Division Multiple Access ("CDMA"), Time Division Multiple Access ("TDMA"), Global System for Mobile Communications ("GSM"), General Packet Radio Service ("GPRS"), Frequency Division Multiple Access ("FDMA"), other IEEE 802.16 standards, Orthogonal Frequency Division Multiplexing ("OFDM"), Orthogonal Frequency Division Multiple Access ("OFDMA"), Wireless LAN ("WLAN"), WiMAX, or the like. The wireless communications networks 102, 104 are able to be an IP or SIP based connectivity network, which provides data connections at much higher transfer rates then a traditional circuit services network. These networks are able to comprise an Evolution Data Only ("EV-DO") network, a General Packet Radio Service ("GPRS") network, a Universal Mobile Telecommunications System ("UMTS") network, an 802.11 network, an 802.16 (WiMAX) network, Ethernet connectivity, dial-up modem connectivity, or the like.

A circuit services network is able to provide, among other things, voice services to the wireless devices 108, 110 communicatively coupled to one or both of networks 102, 104. Other applicable communications standards include those used for Public Safety Communication Networks including TErrestrial TRunked rAdio ("TETRA") and P25 Trunking. The following discussion uses an example of an host/primary network 102 providing Land Mobile Radio System ("LMRS") services such as P25 Trunking and a secondary network 104 providing WiMAX communication system services. It should be noted that these network technologies are only used as an illustrative example and do not limit further embodiments of the present invention.

Each of the wireless communication networks includes a plurality of base stations 116, 118. Each of the base stations 116, 118 is communicatively coupled to an information processing system 120, 122 such as a site controller 120, 122. Each of the site "call" controllers 120, 122 includes a channel assignment manager 124, 128 and a call manager 126, 130. The channel assignment manager 124, 128 and the call manager 126, 130 are discussed in greater detail below. The wireless communication system 100 also includes one or more information processing systems 132 that monitor control messages, such as channel assignment and de-assignment messages sent between the channel assignment manager 124 of the host/primary network 102 and the base stations 116 of the host/primary network 102. These control messages can be intercepted by the information processing system 132 or interact with an interface to the site controller 120 such as (but not limited to) an API or a billing interface to monitor assignment information.

It should be noted that, in one embodiment, the functions of the information processing system(s) 132 can also be implemented at the Host site controller 120. In one embodiment, the control messages are sent through the wired communication network 112 and passively monitored by a monitor link 106. It should be noted that the monitor link 106 can be wireless or wired (such as fiber optic).

The information processing system 132, in one embodiment, includes one or more spectrum coordination controllers ("SCC") 134 that coordinates the allocation of available spectrum/communication frequencies not used by the host/primary network 102 to the secondary network 104. The information processing system 132 includes a computer program storage medium that includes a channel assignment monitor 136, a channel assignment tracker 138, a channel availability transmitter 140, a second channel assignment monitor 150, a second channel availability transmitter 152, and a channel assignment database 142. The SCC 134 and each of its components are discussed in greater detail below. Specifications of channels that are unassigned by the host/primary network 102 are communicated to the secondary network 104 through a data link 107. It should be noted that the data link 107 can be wireless or wired (such as fiber optic).

Dynamic Spectrum/Communication Channel Allocation Coordination

As discussed above, in one example, the existing host/primary network 102 is a narrowband voice system (e.g., P25 LMRS) and the secondary network 104 is a wide band data-centric solution used to transport content such as video (e.g., WiMAX). In one example, the host/primary network 102 follows a given channel filling algorithm for allocating communication frequencies. For example, channel selection can start from the low end of the band to the high end of the band or vice versa. The SCC 134 of one embodiment, as discussed above, is communicatively coupled to both the host/primary network 102 and the secondary network 104 so as to allow the SCC 134 to monitor control messages of the host/primary network 102 and provide available spectrum information to the secondary network 104.

The channel assignment monitor 136 monitors spectrum/communication channel allocations at the host/primary network 102. For example, the channel assignment monitor 136 monitors for and detects channel allocation and de-allocation commands, which are generally referred to herein as channel allocation commands, issued by the channel assignment manager 124 at the host/primary network 102. The SCC 134 analyzes the monitored channel allocation and de-allocation information and stores the information in a channel assignment database 142. For example, the SCC 134 determines which communication frequencies are currently assigned/unassigned in the host/primary network 102 and tracks these assignments via the channel assignment database 142.

Figure 2:
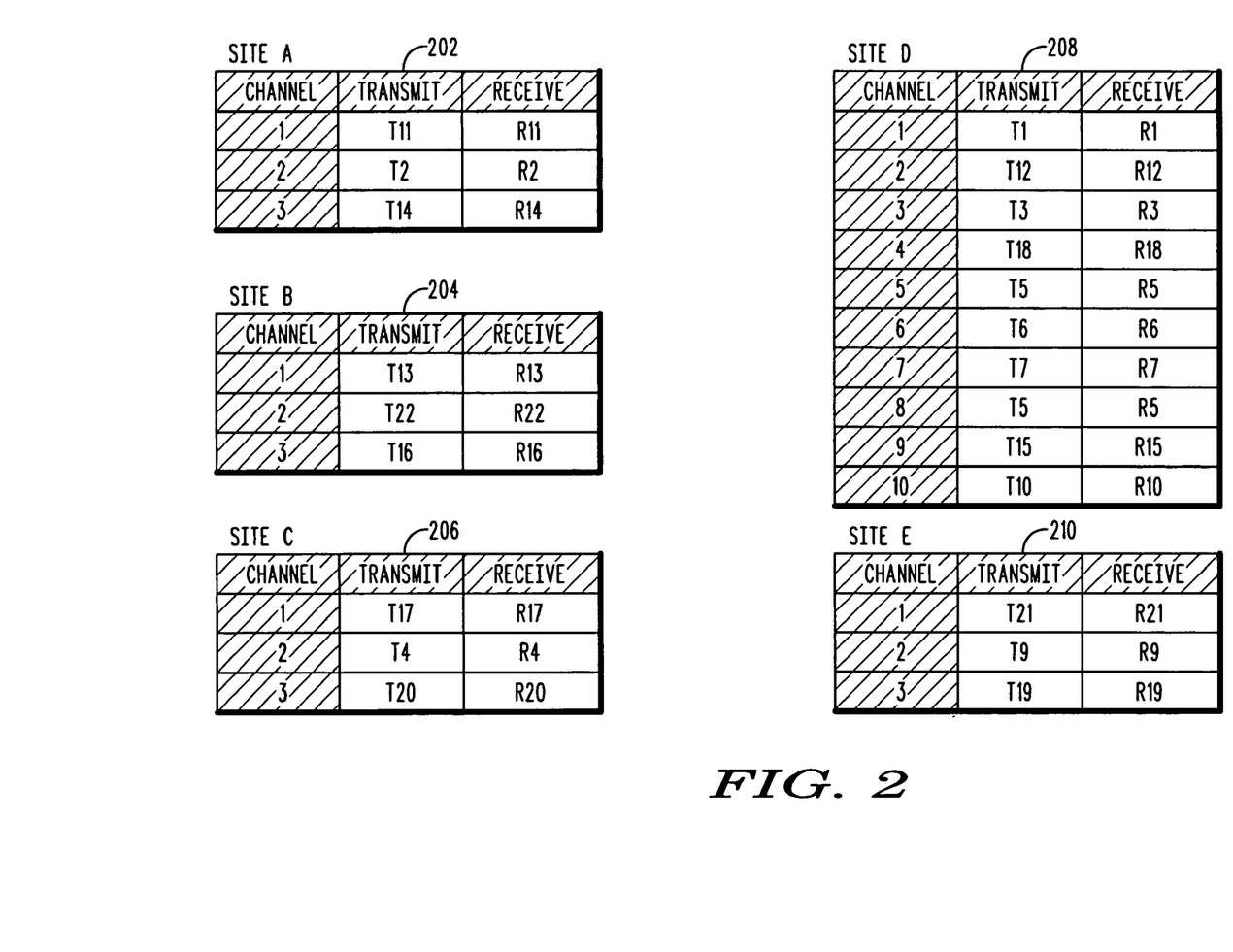
FIG. 2 illustrates examples of identified communication frequencies across various base stations of sites, according to one embodiment of the present invention.
Figure 3:
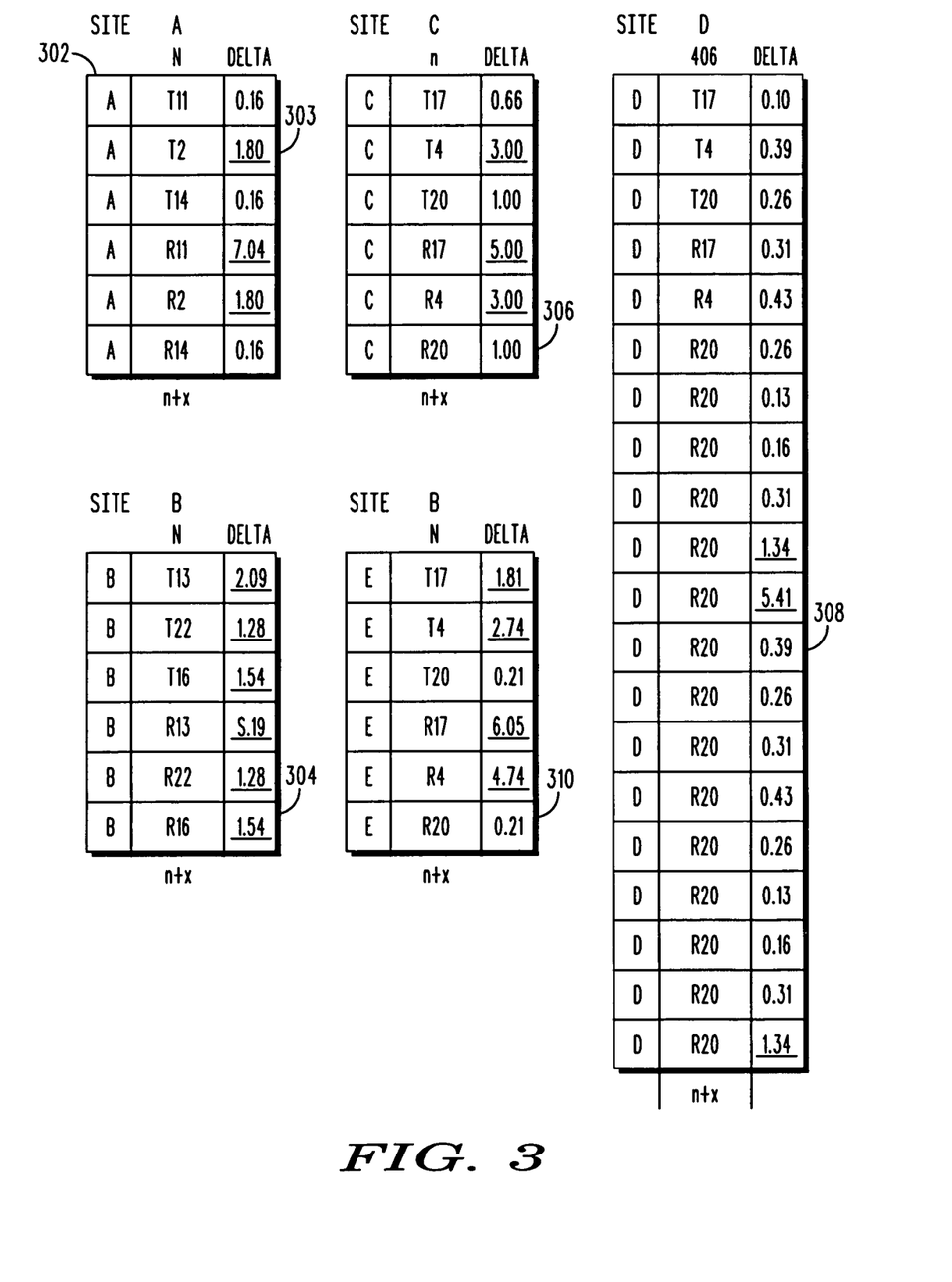
FIG. 3 illustrates examples of communication frequencies identified by a channel assignment monitor as being either assigned/unassigned at each of the communication sites of FIG. 2, according to one embodiment of the present invention.

A channel assignment tracker 138 determines, in response to the monitoring of channel assignments, a set of communication frequencies that have been assigned to wireless devices associated with the host/primary network 102. Based on the channels assigned by the host/primary network 102, the channel assignment tracker is able to determine the communication frequencies or range of channels that can be utilized by the secondary network 104. It should be noted that the term "spectrum" refers to channel frequencies that are used within a network for communication/data services. Examples of channel frequencies identified by the SCC 134 across various base stations of sites are illustrated in FIG. 2. Examples of channel frequencies identified by the channel assignment monitor 136 as being either assigned/unassigned are illustrated in FIG. 3. FIG. 2 shows a table 202, 204, 206, 208, 210 for each monitored site/base station 116 in a primary network(s) 102. Each table 202, 204, 206, 208, 210 illustrates the frequency allocation used by the site within the host network. For example, the table 202 for Site A indicates that Site A utilizes Channels 1-3. Channel 1 has a transmit frequency of T11 and a receive frequency of R11. Channel 2 has a transmit frequency of T2 and a receive frequency of R2. Channel 3 has a transmit frequency of T14 and a receive frequency of R14.

Once the SCC 134 determines the spectrum in use (or not in use) by the host/primary network 102, the channel availability transmitter 140 transmits, in response to determinations by the channel assignment tracker 138, to the secondary network 104, a specification of unused communication frequencies within the plurality of communication frequencies.

FIG. 3 shows a table 302, 304, 306, 308, 310 for each of the sites in FIG. 2 illustrating potentially available spectrum that can be utilized by the secondary network 102. It is important to note that channel assignments may not be contiguous and if a channel is deemed available, the adjacent spectrum below and above the channel to neighboring channels can also be utilized by a secondary network. For example, these tables show that the minimum frequency of the host/primary network 102 is n and the maximum frequency is n+x. As discussed above with respect to FIG. 2, the channel assignment monitor 136 has determined that the following frequencies T2, T11, T14, R2, R11, and R14 have been allocated to Site A and at some point may be available for use. The tables of FIG. 3 also identify the delta, or separation, between each frequency. For example, the table 302 associated with Site A shows that the delta between T2 and T11 is 1.80 MHz.

The channel assignment tracker 138 has also identified portions of the spectrum utilized by each of the sites of the host/primary network 102 that can potentially be used by the secondary network 104, as shown in FIG. 3. For example, the spectrum between T2 and T11 corresponding to the delta of 1.80 MHz has been identified by the channel assignment tracker 138 as potential spectrum that can be utilized by the secondary network 104. Each of the rows in FIG. 3 that include underlined values in the "delta" column such as row 303 illustrates potential spectrum that is not utilized by the system and that can be used by the secondary network 104. In particular, underlined numbers indicate potential blocks of spectrum that is not used by the host/primary network 102 and may be suitable for the secondary network 104.

Figure 4:
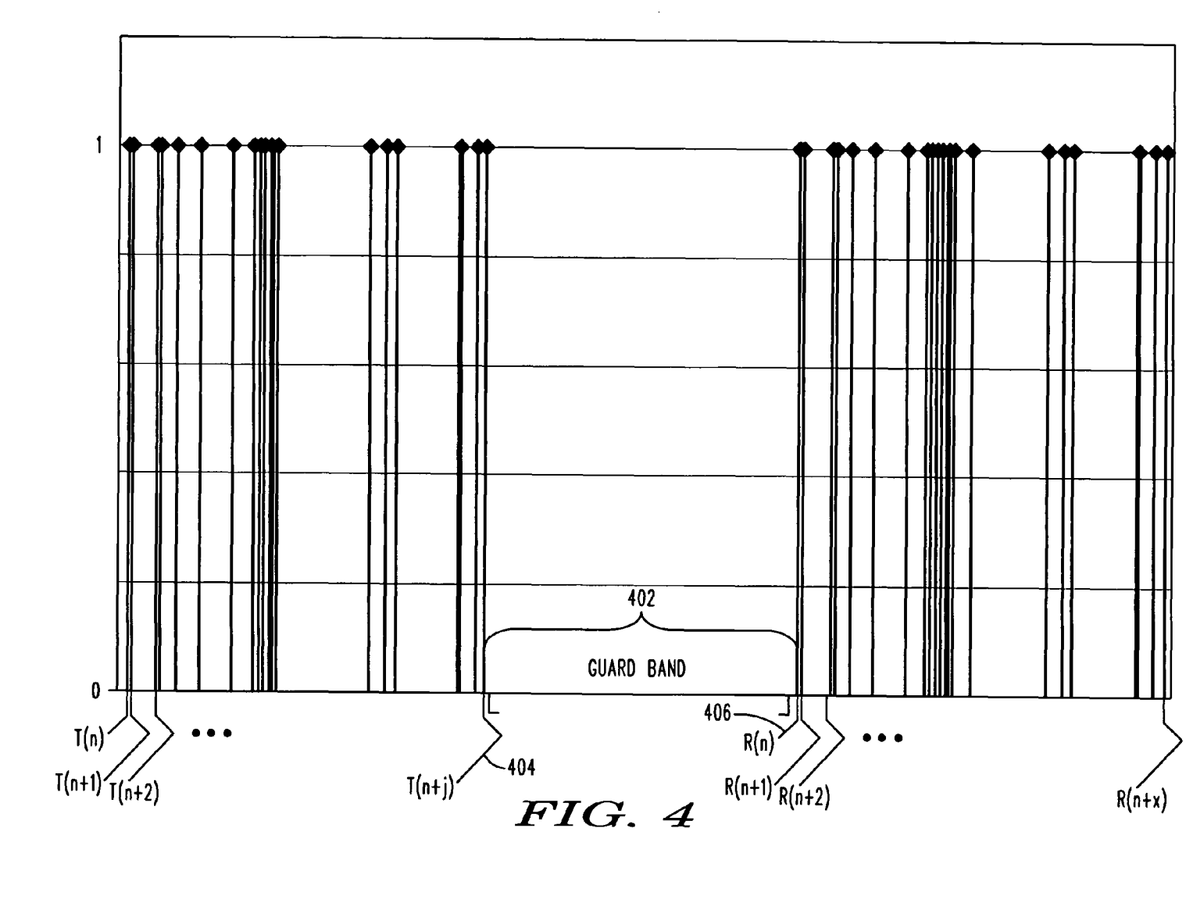
FIG. 4 is a frequency spectrum illustrating the allocated/non-allocated spectrum across the various sites associated with the tables of FIG. 2 and FIG. 3, according to one embodiment of the present invention.

FIG. 4 illustrates spectrum 400 that is allocated/non-allocated by the entire host/primary network comprising sites A, B, C, D, and E associated with the tables of FIG. 2 and FIG. 3. FIG. 4 shows the receiver and transmit frequency pairs separated by a guard band 402. In the n to n+x band, the guard band 402 is 4 MHz wide and is located from T(n+j) 404 to R(n) 406 or the difference between the highest transmit frequency and the lowest receive frequency of the primary system. As can be seen from FIG. 4, the host/primary network 102 comprises spectrum that can be utilized by the secondary network 104. The secondary network 104 determines the location of a "home" or "control" channel, perhaps in the guard band 402 or in some of the other identified holes. Thus, in real-time the "home" channel can be relocated or can grow or shrink in a contiguous and non-contiguous manner depending on the usage requirements of the host/primary network 102.

The SCC 134 communicates spectrum information to the secondary network 104 via the link 107 (in this example). The channel assignment manager 128 of the secondary network 104 receives this information and determines the available frequencies in the host/primary network 102 that it can utilize. As discussed above, the secondary network 104, in one example, utilizes orthogonal frequency division multiplexing ("OFDM"), which is used to create a wideband modulus comprising a multiplicity of narrowband channels. A single narrowband channel can occupy the same amount of bandwidth required to support a single narrowband voice channel of the host/primary network 102, thereby facilitating filling of the band on a per channel basis.

The channel assignment manager 128 of the secondary network also establishes a home or control channel within spectrum that has the highest probability of going unused by the host/primary network such as in the guard band area 402 illustrated in FIG. 4. A control channel of the secondary network allows a wireless device to transmit call request, receive traffic channel assignments, and perform other similar functions. In a further embodiment, the SCC 134 includes a second channel assignment monitor 150 that determines the frequency or frequency ranges that are being utilized by the secondary network 104 as its control channel. The SCC 134 of that further embodiment then updates its channel assignment database 142 accordingly. For example, the second channel assignments monitor 150 monitors the channel allocation commands and control information issued by the channel assignment manager 128 of the secondary network 104. In other words, the second channel assignment monitor 150 is adapted to accept a message from at least one secondary network 104 that comprises a second specification of communication frequencies from the plurality of communication frequencies that are not to be used by the host/primary network 102. Such operations by this further embodiment allow the SCC 134 to identify spectrum being utilized by the secondary network 104 and provide instructions to the host/primary network 102, in embodiments that support such instructions, to not use the spectrum currently used by the secondary network 104.

When the call manager 130 of the secondary network 104 receives a call request from a wireless device 110, a channel assignment manager 128 of a further embodiment is able to allocate a communication channel to the device 110 from the set of available communication frequencies identified by the SCC 134. The second channel assignment monitor 150 of this further embodiment detects this channel assignment and updates its channel assignment database 142 accordingly. A second channel availability transmitter 152 then transmits the specification of communication frequencies that are not to be used by the host/primary network 102 to the host/primary network 102.

As can be seen, one embodiment of the present invention is advantageous in that it increases the overall spectral efficiency of networks by providing real-time coordinated use of common spectrum between separate networks incorporating potentially dissimilar networking technologies. One embodiment of the present invention monitors spectrum allocation commands and control information associated with an existing host/primary network to identify unused spectrum. One embodiment of the present invention then instructs a secondary network to utilize the unused spectrum by adapting to and scavenging spectrum not used by the host/primary network at any given time.

In a further embodiment, it should be noted that the allocation commands associated with the host/primary network 102 monitored by the SCC 134 can also comprise commands indicating that a particular frequency or frequency range(s) is to be prevented from being utilized by the secondary network 104. In such one embodiment, the SCC 134 does not include that particular frequency or frequency range in the listing of available frequencies sent to the secondary network 104. In one embodiment, the secondary network 104 can also issue a command that instructs the host/primary network 104 to not allocate a particular frequency or frequency range(s). The SCC 134, in this embodiment, receives the command and instructs the host/primary network 102 accordingly.

As discussed above, the available spectrum of the host/primary network 102 is dynamic. In other words, the available spectrum changes over time. For example, a wireless device 108 at the host/primary network 102 can request a call setup. The call manager 124 at the host/primary network 102 and the channel assignment manager 124 allocates a particular channel to the device 108 to service that call. However, that channel may be currently in use by the secondary network 104.

In one embodiment, the SCC 134 detects an allocation command for that particular channel. Therefore, the SCC 134 issues a command to the secondary network 104 to de-allocate that channel. If the secondary system is using that channel, it is de-allocated by the secondary network 104. Hence, secondary use policies determining how the secondary network 104 utilizes the available spectrum can be enforced. In one embodiment, the secondary network 104 can be instructed to yield right-of-way to the host/primary network so that the host/primary network 102 gets priority over the use of the spectrum. It is obvious to those skilled in the art that other policies/etiquette can be developed and enforced. For example, the device 108 can issue an emergency call request that must be assigned immediately. If these two systems (host 102 and secondary 104) know about each other they can reserve the other's spectrum during normal conditions, but if an emergency call was needed and the host/primary network 102 does not have any available channels, the secondary network 104 releases any reserved spectrum in the host/primary network 104

Figure 5:
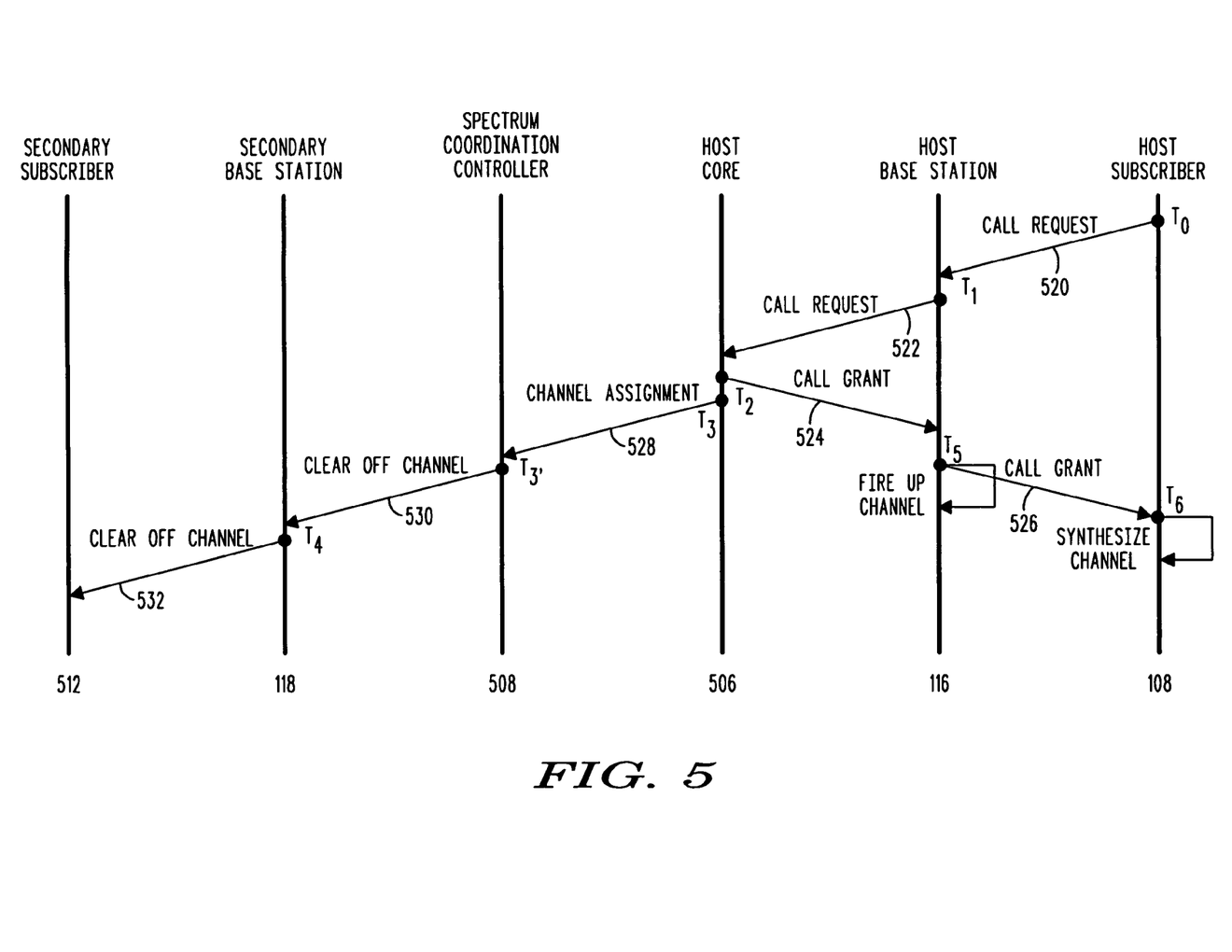
FIG. 5 is a transactional diagram illustrating the process accommodating a host/primary network allocating a communication channel currently being utilized by a secondary network, according to one embodiment of the present invention.

FIG. 5 shows a transactional diagram illustrating this process. Time is depicted in FIG. 5 by the vertical scale. At time $T_0$, a wireless device 108 subscribing to the host/primary network 102 submits a call request 520 to its host base station 116. At time $T_1$, the call request 522 is sent to the host core 506 and the call request is granted at time $T_2$. At time $T_3$, the channel assignment manager 124 of the host/primary network 102 allocates a channel to the requesting device 108. The SCC 134, at time $T_{3'}$, detects the channel assignment via an allocation command 528, which is monitored by the monitor link 106. At time $T_{3'}$, the SCC 134 also instructs the base station 118 at the secondary network 104 to not use the channel. In the event that the secondary network 104 was using the channel, the base station 118 at the secondary network 104, at time $T_4$, performs the de-allocation of that channel. The base station 116 at the host/primary network 102, at time $T_5$, initiates use of the channel. The wireless device 108 of the host/primary network 102 adjusts its synthesizer to the channel at time $T_6$ so that the call requested by the device 108 can be made.

Exemplary Wireless Device

Figure 6:
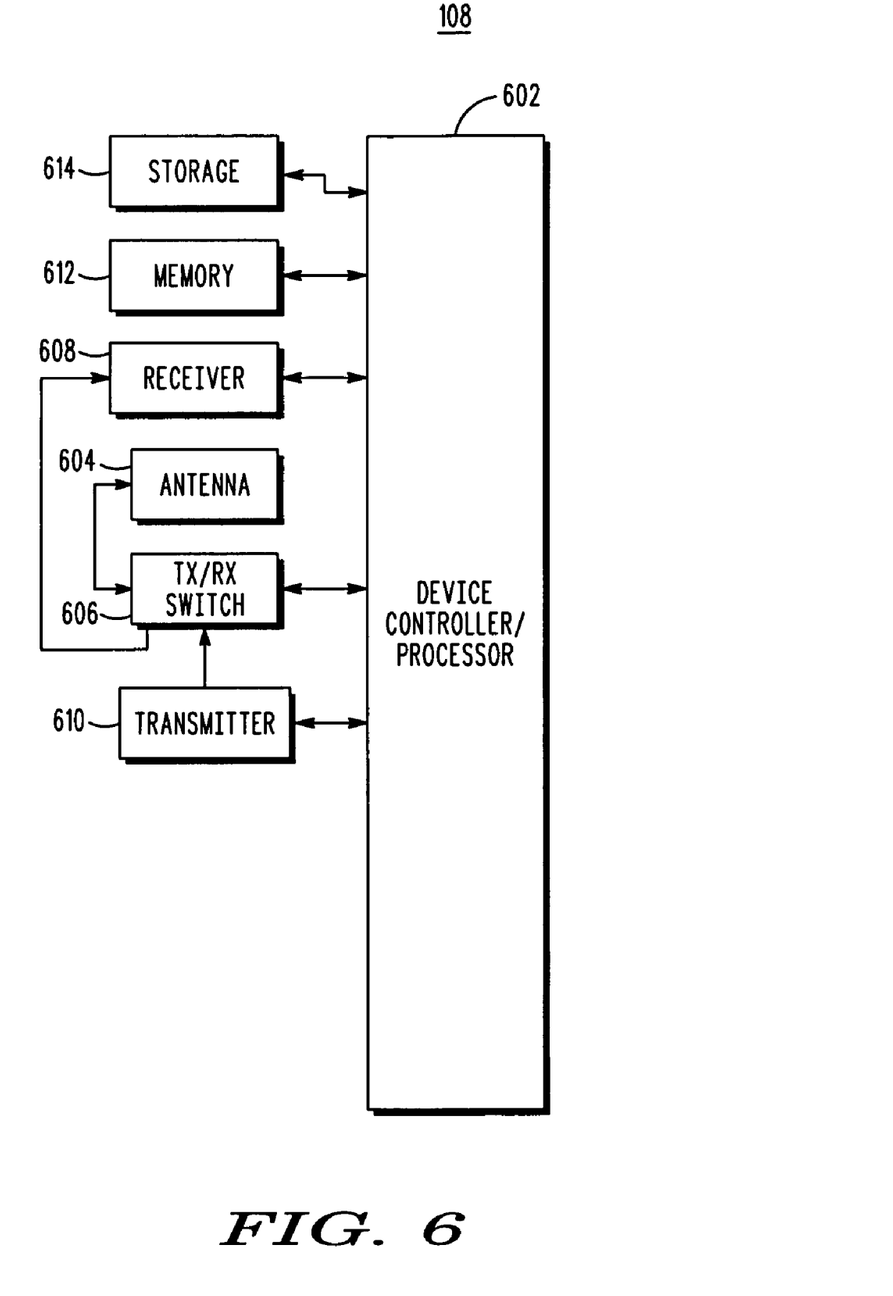
FIG. 6 is a block diagram illustrating a detailed view of a wireless device according to one embodiment of the present invention.

FIG. 6 is a block diagram illustrating a detailed view of the wireless device 108, 110 according to one embodiment of the present invention. It is assumed that the reader is familiar with wireless communication devices. To simplify the present description, only that portion of a wireless communication device that is relevant to the present invention is discussed. The wireless device 108 operates under the control of a device controller/processor 602, that controls the sending and receiving of wireless communication signals. In receive mode, the device controller 602 electrically couples an antenna 604 through a transmit/receive switch 606 to a receiver 608. The receiver 608 decodes the received signals and provides those decoded signals to the device controller 602.

In transmit mode, the device controller 602 electrically couples the antenna 604, through the transmit/receive switch 606, to a transmitter 610. It should be noted that in one embodiment, the receiver 608 and the transmitter 610 are a dual mode receiver and a dual mode transmitter for receiving/ transmitting over various access networks providing different air interface types. In another embodiment a separate receiver and transmitter is used for each of type of air interface.

The device controller 602 operates the transmitter and receiver according to instructions stored in the memory 612. These instructions include, for example, a neighbor cell measurement-scheduling algorithm. The wireless device 108, also includes non-volatile storage memory 614 for storing, for example, an application waiting to be executed (not shown) on the wireless device 108.

Information Processing System

Figure 7:
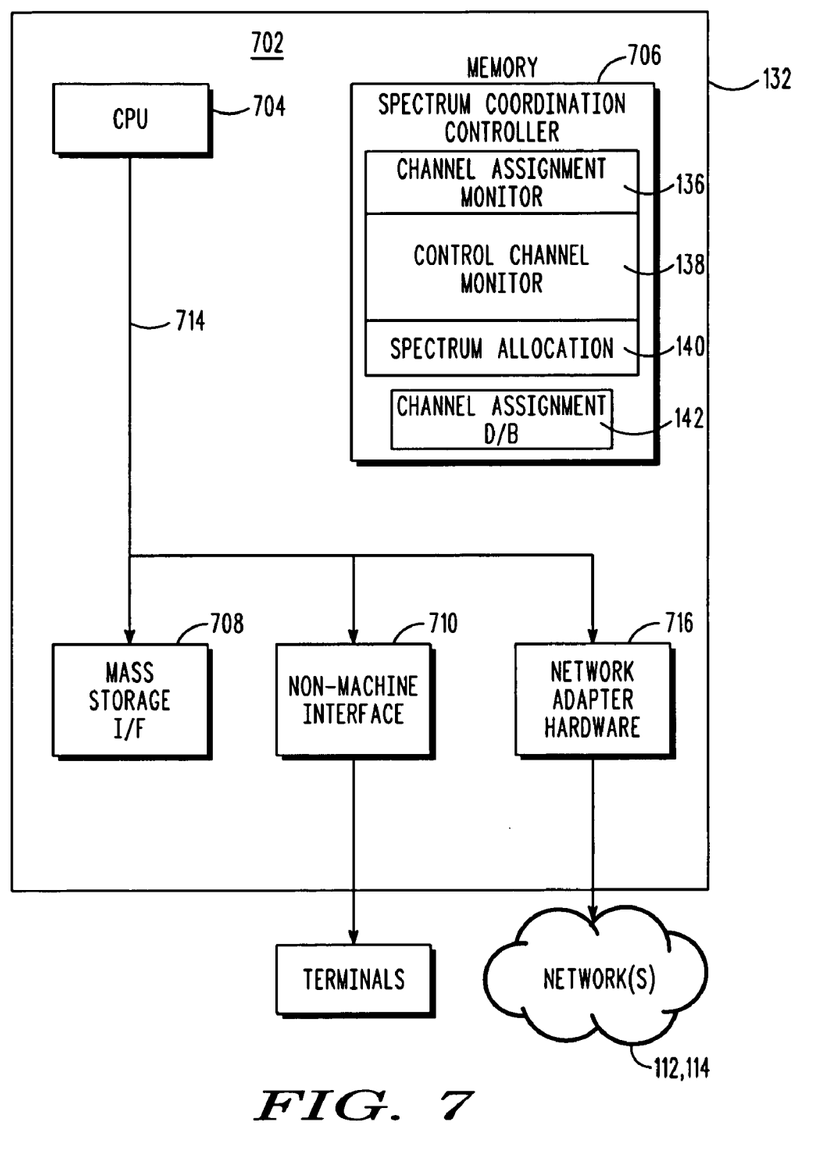
FIG. 7 is a block diagram illustrating a detailed view of an information processing system, according to one embodiment of the present invention.

FIG. 7 is a block diagram illustrating a more detailed view of an information processing system 132. It should be noted that although the following discussion is with respect to the information processing system 130 comprising the SCC 134, the information processing system 132 is based upon a suitably configured processing system adapted to implement one embodiment of the present invention. For example, a personal computer, workstation, or the like, may be used. The information processing system 132 includes a computer 702. The computer 702 has a CPU processor 704 that is connected to a main memory 706, a mass storage interface 708, a man-machine interface 710, and network adapter hardware 716. A system bus 714 interconnects these system components.

The main memory 706 includes the SCC 134, which comprises a channel assignment monitor 136, a channel assignment tracker 138, a channel availability transmitter 140, a channel availability transmitter, a second channel assignment monitor 150, a second channel availability transmitter 152, and a channel assignment database 142, which have all been discussed in greater detail above.

The main memory 706 also includes the channel assignment database 142. Although illustrated as concurrently resident in the main memory 706, it is clear that respective components of the main memory 706 are not required to be completely resident in the main memory 706 at all times or even at the same time. Furthermore, one or more of these components can be implemented as hardware.

The mass storage interface 708 can store data on a hard-drive or media such as a CD or DVD. The man-machine interface 710 allows technicians, administrators, and other users to directly connect to the information processing system 130 via one or more terminals 718. The network adapter hardware 716, in one embodiment, is used to provide an interface to the communication network 112, 114. Embodiments of the present invention are able to be adapted to work with any data communications links, including present day analog and/or digital techniques or via a future networking mechanism.

Figure 8:
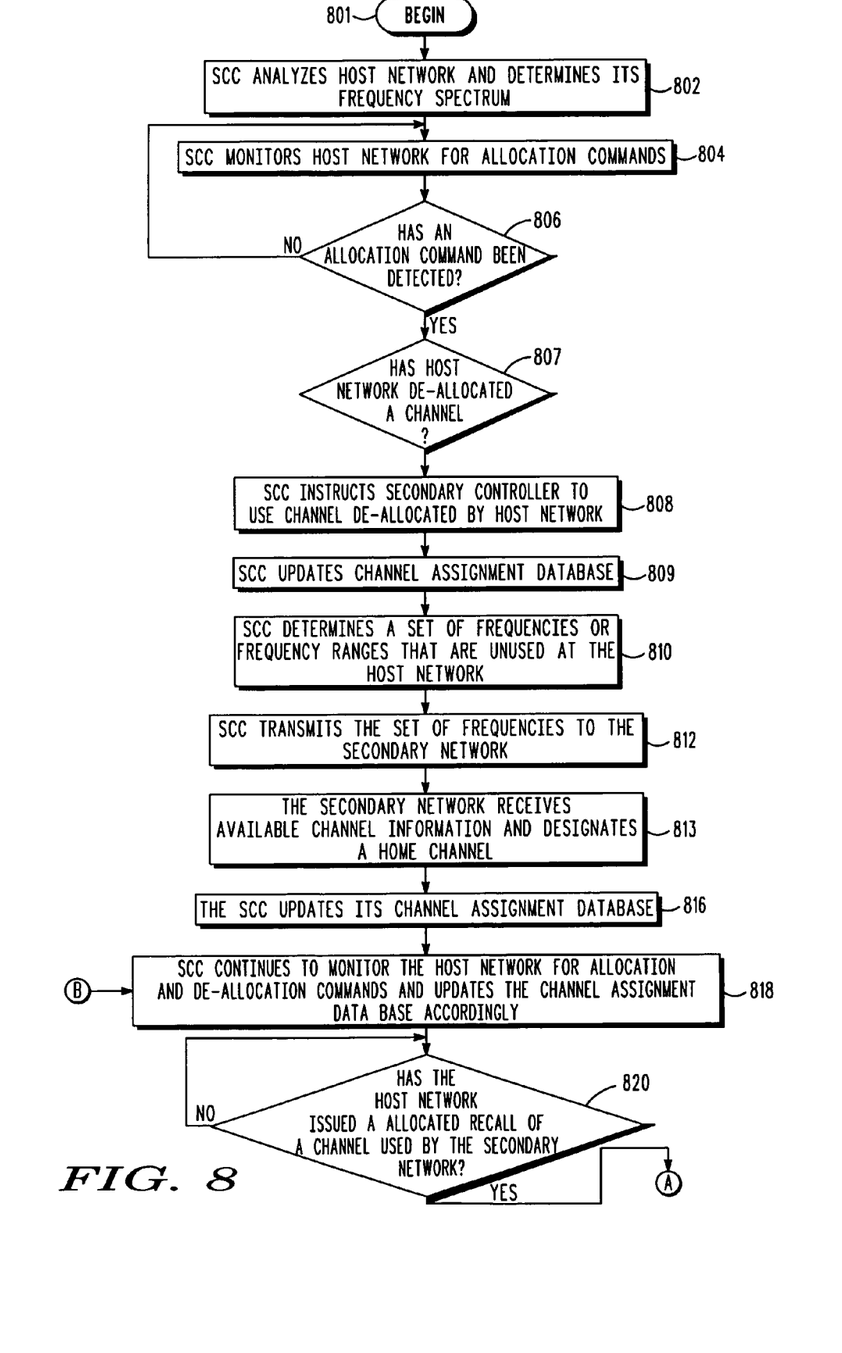
FIGS. 8-9 are operational flow diagrams illustrating a process of coordinating the allocation of unused spectrum between a host/primary network and a secondary network, according to one embodiment of the present invention.

Process of Coordinating Spectrum Allocation Between an Underlay Network and an Overlay Network FIG. 8 is an operational flow diagram illustrating a process of coordinating spectrum use between a host/primary network 102 and one or more secondary networks 104. The operational flow diagram of FIG. 8 begins at step 801 and flows directly to step 802. The SCC 134, at step 802, analyzes the host/primary network 102 and determines the frequency spectrum being used within the network 102. In one embodiment, the SCC 134 can analyze initial data to help identify the host/primary network 102 that it is to center on. However, this is not required. The SCC, at step 804, monitors the host/primary network 102 for allocation and de-allocation commands and control information. The SCC 134, at step 806, determines if an allocation command has been detected. If the result of this determination is negative, the SCC 134 continues to monitor for allocation commands and control information. If the result of this determination is positive, the SCC 134, determines at step 807, if the host/primary network de-allocated a channel. If the host/primary network did de-allocate a channel, the processing continues by the SCC instructing, at step 808, the secondary controller to use the channel de-allocated by the host network. After such instruction, or if the SCC determined that the host/primary network did not de-allocate a channel, the SCC updates, at step 809, its channel assignment database 142.

The SCC 134, at step 810, determines a set of frequencies and/or frequency ranges that are currently unused at the host/primary network 102. The SCC 134, at step 812, transmits the set of frequencies and/or frequency ranges to the secondary network 104. As discussed above, the host/primary network 102 can issue a command to base stations in that network that is monitored by the SCC 134 that indicates one or more frequencies or frequency ranges are used by the host network, and therefore are not to be utilized by the secondary network 104.

The secondary network 104, at step 813, receives the set of frequencies and/or frequency ranges and may designate one or more of the frequencies as a control/home channel. In one embodiment, the SCC 134 assumes that all frequency ranges indicated to the secondary overly network 104 as available are used by that network. In further embodiments, the SCC 134 is able to identify the frequency(s) utilized by the secondary network 104 designated as the control/home channel by, for example, monitoring assignments made by the secondary network 104. In either embodiment, the SCC 134, at step 816, updates its channel assignment database 142 accordingly. The wireless subscribers 110 of the secondary network 104, at step 816, are also updated with the control/home channel information.

The SCC 134, at step 818, monitors the host/primary network 102 for channel assignments and updates its channel assignment database 142 accordingly. For example, if the SCC 134 detects that the host/primary network 102 has assigned a channel to a wireless device 108, the SCC 134 updates the channel assignment database. It should be noted that the SCC 134 is also continuing to monitor the channel assignments and deassignments at the host/primary network 102. The SCC 134, at step 820, determines if the host/primary network 102 is allocating channels, which can be a home (control) or expansion channel (e.g., a channel used by the secondary network 104 as a traffic channel). If the result of this determination is negative, the SCC 134 continues to monitor for channel assignments/de-assignments by the host/primary network 102. If the result of this determination is positive, the control flows to entry point A of FIG. 9.

Figure 9:
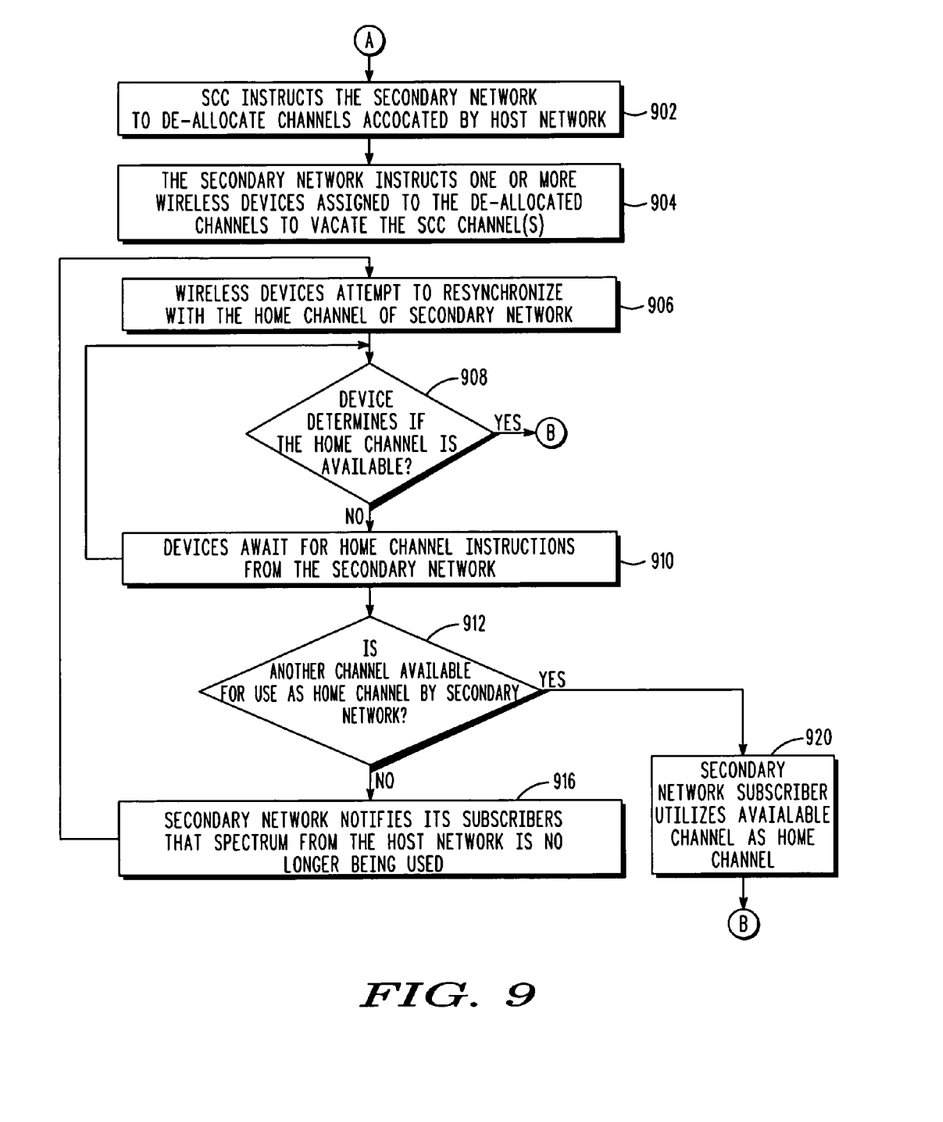

The SCC 134, at step 902, instructs the secondary network 104 that the channel is no longer available for use and must de-allocate that channel for its use. The secondary network 104, at step 904, instructs the wireless device 110 assigned to that particular channel to vacate the channel. If the channel is a home/control channel then all of the wireless devices 110 subscribing to the secondary network 104 are instructed to vacate the channel. The wireless devices 110, at step 906, attempt to resynchronize with their new home channel. The wireless devices 110, at step 908, determine if the home channel is available. If the result of this determination is positive, the control flows back to step 818 of FIG. 8. If the result of the determination is negative, the wireless devices 110, at step 910, await for home channel allocation instructions from the secondary network 104. Once instructions are received the wireless devices try to synchronize with the new home channel at step 908.

When the SCC 134 instructs the secondary network 104 to de-allocate the channel or channels at issue, the site controller 122 of the secondary system 104, at step 912, determines if another channel is available for the secondary network 104 to use as a home channel. The secondary network 104, at step 916, notifies its wireless subscribers 110 that spectrum from the host/primary network 104 is not going to be used. The control flow returns to step 906. If the result of the determination at step 912 is positive, the wireless subscribers 110 of the secondary network 104, at step 920, proceed to use the indicated channel or channels. The control flows back to step 818 of FIG. 8. It should be noted that after the SCC 134 instructs the secondary network 104 to de-allocate the channel or channels at issue, the secondary network 104 can determine select a new channel(s) to use.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for controlling wireless communication channel allocation between two wireless networks, the method comprising:
    monitoring communication channel allocation commands issued by a first wireless network, wherein the first wireless network comprises a plurality of communication frequencies;
    determining from the communication channel allocation commands a set of communication frequencies that have been assigned from the plurality of communication frequencies to wireless devices associated with the first wireless network, and from at least the set of assigned communication frequencies, determining unused communication frequencies within the plurality of communication frequencies; and
    transmitting, in response to the determining, to at least one second wireless network, a specification of the unused communication frequencies within the plurality of communication frequencies.

2. The method of claim 1, wherein the communication channel commands are communicated among at least some components of the first wireless network via a wired link.

3. The method of claim 1, further comprising:
    accepting a message from at least one second wireless network comprising a specification of communication frequencies from the plurality of communication frequencies that are not to be used by the first wireless network; and
    transmitting the specification of communication frequencies that are not to be used by the first wireless network to the first wireless network.

4. The method of claim 1, wherein the at least one second wireless network accepts the specification of unused communication frequencies and assigns at least one of the unused communication frequencies to at least one wireless device associated with the at least one second wireless network.

5. The method of claim 1, wherein at least one wireless communication controller associated with the at least one second wireless network accepts the specification of unused communication frequencies and designates at least one unused communication channel as a wirelessly exchanging control channel for the at least one second wireless network.

6. The method of claim 1, further comprising:
    determining from the communication channel allocation commands that the first wireless network has allocated a communication channel within the specification of unused communication frequencies; and
    notifying the at least one second wireless network of an unavailability of the communication channel allocated within the specification of the unused communication frequencies.

7. The method of claim 6, further comprising:
    determining by the at least one second wireless network in response to the notifying, that the communication channel allocated within the specification of the unused communication frequencies is assigned by the first wireless network; and
    de-allocating by the at least one second wireless network, in response to the determining, the communication channel allocated within the specification of the unused communication frequencies assigned by the first wireless network.

8. The method of claim 1, further comprising:
    receiving, in response to the transmitting, a request from the at least one second wireless network, to reserve at least one communication channel in the plurality of communication frequencies; and
    instructing, in response to the receiving, the first wireless network to reserve the at least one communication channel.

9. A wireless communication controller comprising:
    a channel assignment monitor adapted to monitor communication channel allocation commands issued by a first wireless network, wherein the first wireless network comprises a plurality of communication frequencies;
    a channel assignment tracker, communicatively coupled to the channel assignment monitor, adapted to determine from the communication channel allocation commands monitored by the channel assignment monitor, a set of communication frequencies that have been assigned from the plurality of communication frequencies to wireless devices associated with the first wireless network, and from at least the set of assigned communication frequencies, adapted to determine unused communication frequencies within the plurality of communication frequencies; and
    a channel availability transmitter communicatively coupled to the channel assignment tracker, adapted to transmit, in response to determinations by the channel assignment tracker, to at least one second wireless network, a specification of the unused communication frequencies within the plurality of communication frequencies.

10. The wireless communications controller of claim 9, wherein the communication channel allocation commands are communicated among at least some components of the first wireless network via a wired link, and wherein the channel assignment monitor is adapted to monitor the wired link.

11. The wireless communications controller of claim 9, further comprising:
    a second channel assignment monitor, communicatively coupled to the channel assignment tracker, adapted to accept a message from at least one second wireless network comprising a specification of communication frequencies from the plurality of communication frequencies that are not to be used by the first wireless network; and
    a second channel availability transmitter, communicatively coupled to the second channel assignment monitor, adapted to transmit the specification of communication frequencies that are not to be used by the first wireless network to the first wireless network.

12. The wireless communications controller of claim 9, wherein the at least one second wireless network accepts the specification of unused communication frequencies and assigns at least one of the unused communication frequencies to at least one wireless device associated with the at least one second wireless network.

13. The wireless communications controller of claim 9, wherein at least one wireless communication controller associated with the at least one second wireless network accepts the specification of unused communication frequencies and designates at least one unused communication channel as a wirelessly exchanging control channel for the at least one second wireless network.

14. The wireless communications controller of claim 9,
wherein the channel assignment tracker is further adapted to determine from the communication channel allocation commands monitored by the channel assignment monitor, that the first wireless network has allocated a communication channel within the specification of the unused communication frequencies, and
wherein the channel availability transmitter is further adapted to notify the at least one second wireless network of an unavailability of the communication channel allocated within the specification of the unused communication frequencies.

15. The wireless communications controller of claim 9, further comprising:
a second channel assignment monitor, communicatively coupled to the channel assignment tracker, adapted to receive, a request from the at least one second wireless network, to reserve at least one communication channel in the plurality of communication frequencies; and
a second channel availability transmitter, communicatively coupled to the second channel assignment monitor and the channel assignment tracker, adapted to instructing the first wireless network to reserve the least one communication channel.

16. An information processing system comprising:
network adapter hardware;
a processing unit comprising a processor communicatively coupled to a memory, the processing unit communicatively coupled to the network adapter hardware, wherein the processing unit is
adapted to monitor communication channel allocation commands issued by a first wireless network, wherein the first wireless network comprises a plurality of communication frequencies,
adapted to determine from the communication channel allocation commands a set of communication frequencies that have been assigned from the plurality of communication frequencies to wireless devices associated with the first wireless network, and from at least the set of assigned communication frequencies, adapted to determine unused communication frequencies within the plurality of communication frequencies, and
adapted to transmit, in response to the determinations, to at least one second wireless network, a specification of the unused communication frequencies within the plurality of communication frequencies.

17. The information processing system of claim 16, wherein the communication channel commands are communicated among at least some components of the first wireless network via a wired link, and wherein the processing unit is adapted to monitor the wired link.

18. The information processing system of claim 16, wherein the processing unit is further
adapted to accept a message from at least one second wireless network comprising a specification of communication frequencies from the plurality of communication frequencies that are not to be used by the first wireless network and
adapted to transmit the specification of communication frequencies that are not to be used by the first wireless network to the first wireless network.

19. The information processing system of claim 16, wherein the processing unit is further
adapted to determine from the communication channel allocation commands that the first wireless network has allocated a communication channel within the specification of the unused communication frequencies; and
adapted to notify the at least one second wireless network of an unavailability of the communication channel allocated within the specification of the unused communication frequencies.

20. The information processing system of claim 16, wherein the processing unit is further
adapted to receive, a request from the at least one second wireless network, to reserve at least one communication channel in the plurality of communication frequencies and
adapted to instruct the first wireless network to reserve the at least one communication channel.

* * * * *

UNITED STATES PATENT AND TRADEMARK OFFICE
CERTIFICATE OF CORRECTION

PATENT NO. : 8,040,815 B2  Page 1 of 1
APPLICATION NO. : 11/946247
DATED : October 18, 2011
INVENTOR(S) : Silk et al.

It is certified that error appears in the above-identified patent and that said Letters Patent is hereby corrected as shown below:

In Fig. 3, Sheet 3 of 9, delete " [table] " and insert -- [table] --, therefor.

Signed and Sealed this
Eighteenth Day of December, 2012

David J. Kappos
*Director of the United States Patent and Trademark Office*